United States Patent [19]
Janky et al.

[11] Patent Number: 5,644,318
[45] Date of Patent: Jul. 1, 1997

[54] SATPS DYNAMIC SURVEYING FROM A MOVING PLATFORM

[75] Inventors: James M. Janky, Los Altos; Valentine L. Denninger, Sunnyvale; James Edwin Jones, Jr., San Jose; Michael D. Murphy, Sunnyvale; Boris G. Tankhilevich, Walnut Creek, all of Calif.

[73] Assignee: Trimble Navigation Limited, Sunnyvale, Calif.

[21] Appl. No.: 595,818

[22] Filed: Feb. 2, 1996

[51] Int. Cl.⁶ .................. G01S 5/02; H04B 7/185
[52] U.S. Cl. .................................................. 342/357
[58] Field of Search .......................... 342/357, 358, 342/457; 364/449

[56] References Cited

U.S. PATENT DOCUMENTS 4,894,662  1/1990  Counselman ................. 342/357
5,311,194  5/1994  Brown ........................... 342/357
5,345,245  9/1994  Ishikawa et al. ............. 342/357
5,499,032  3/1996  Kelley et al. ................. 342/357

*Primary Examiner*—Thomas H. Tarcza
*Assistant Examiner*—Dao L. Phan
*Attorney, Agent, or Firm*—Boris G. Tankhilevich

[57] ABSTRACT

The mobile station designed for the mobile differential dynamic surveying and targeting is disclosed. The mobile station includes a targeting device for acquiring the coordinates and the image of the designated remote target object. The mobile station further includes a SATPS based differential position-angular determination system capable of determining the coordinates of the mobile station and the angular coordinates of the normal vector to the mobile station. The mobile station receives the differential corrections from the differential station and transmits the data and image information to the third station.

52 Claims, 3 Drawing Sheets

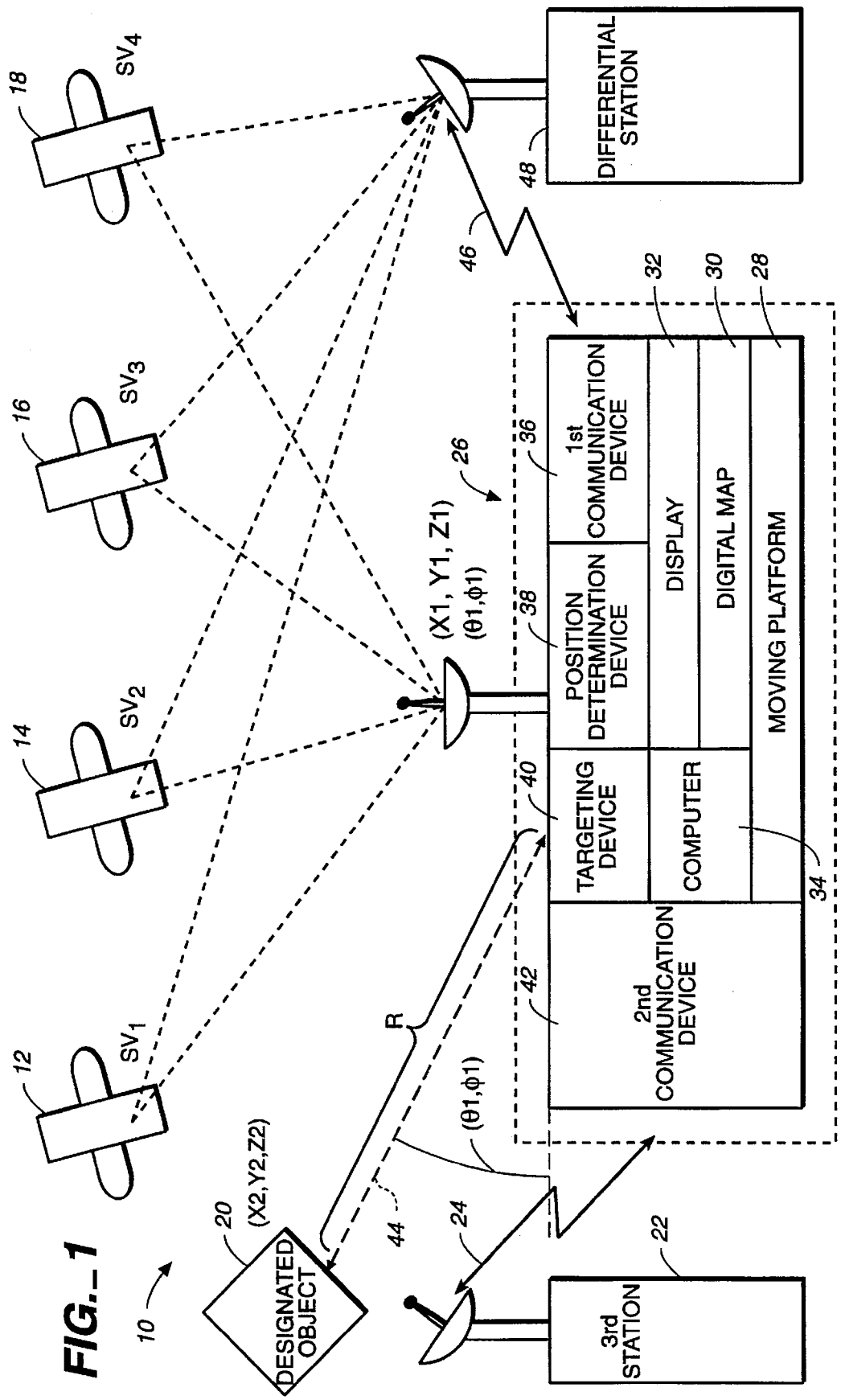
FIG._1

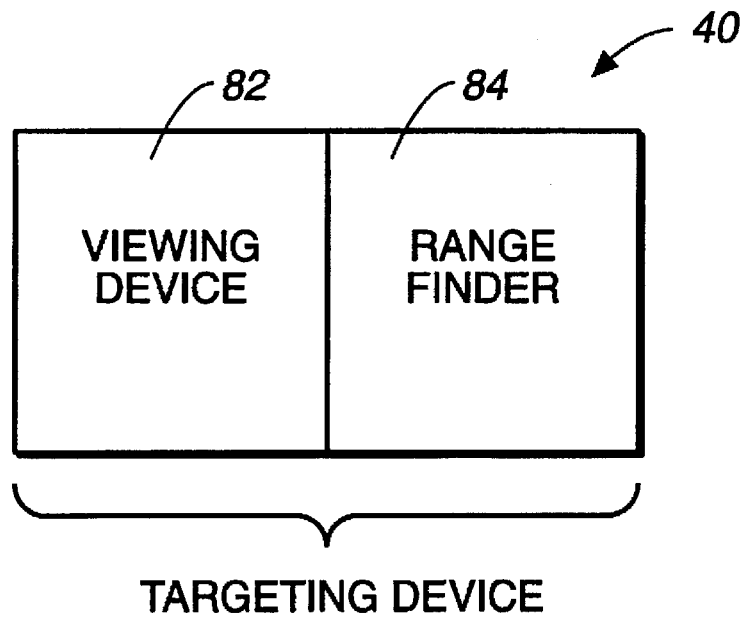
FIG._2
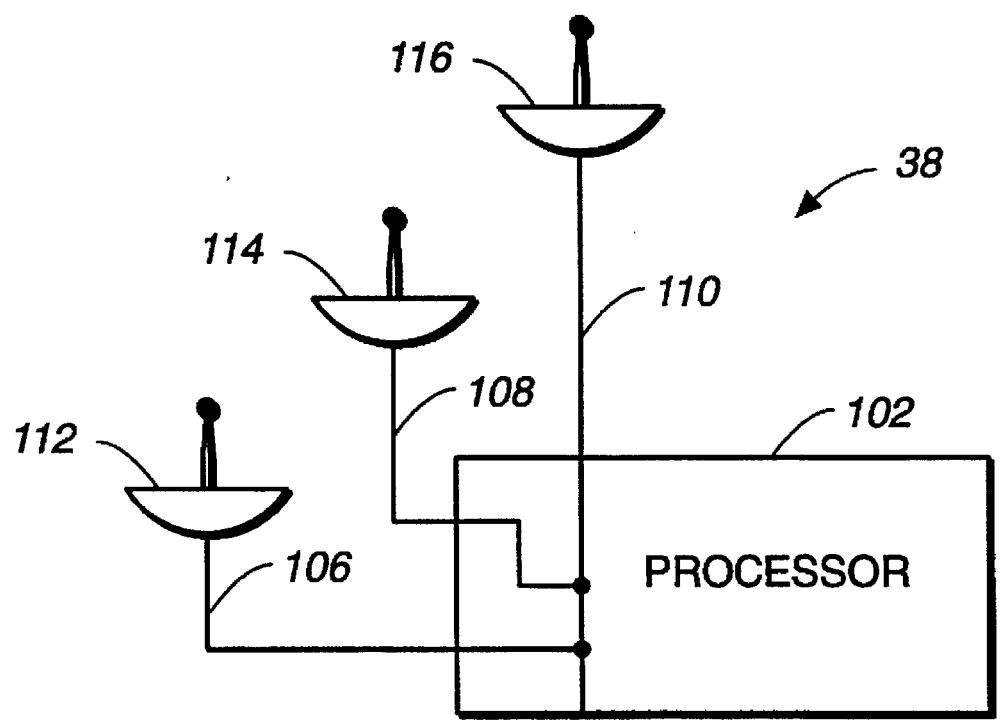
FIG._3

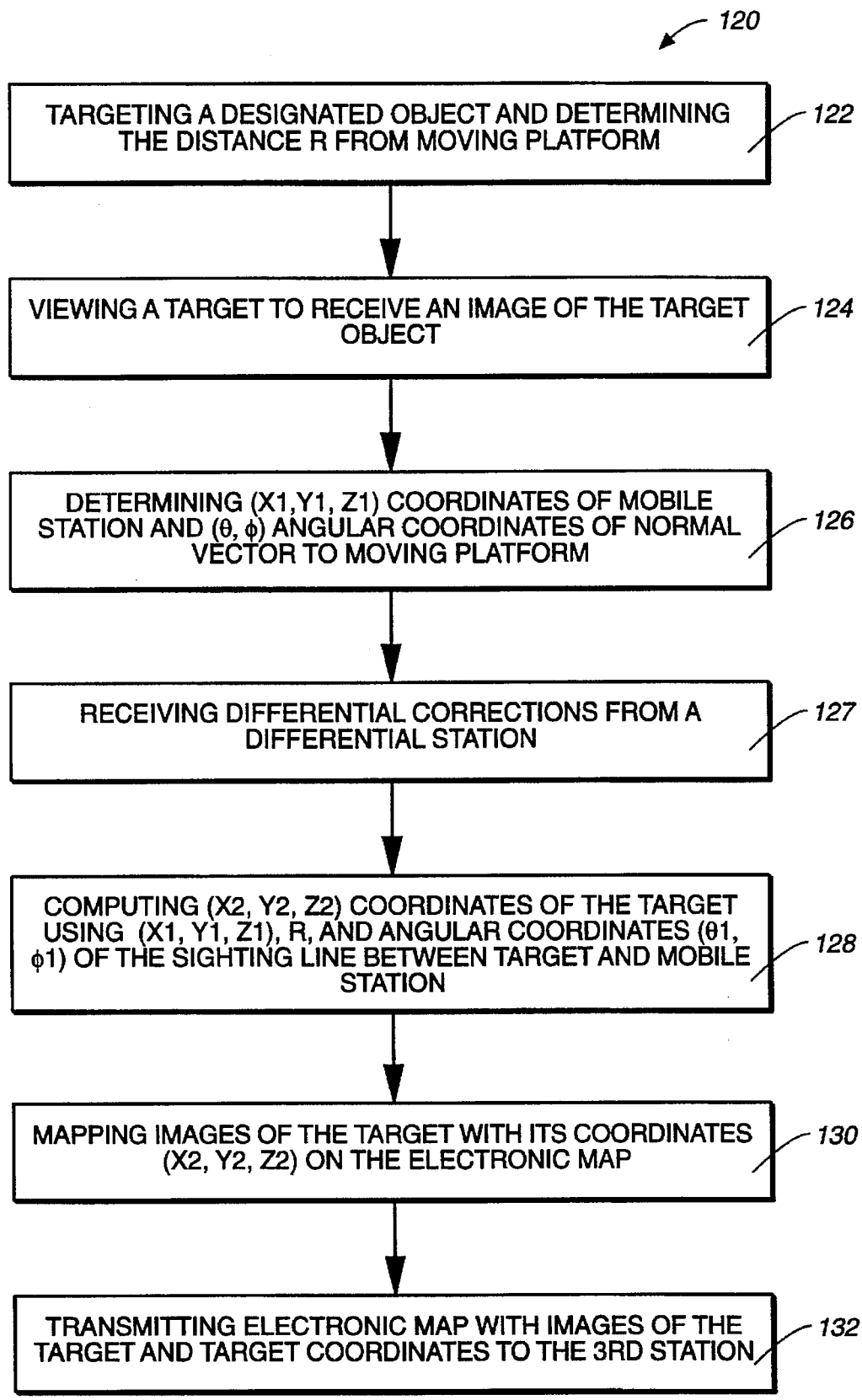
FIG._4

SATPS DYNAMIC SURVEYING FROM A MOVING PLATFORM

BACKGROUND

Reference to a Satellite Positioning System or SATPS herein refers to a Global Positioning System (GPS), to a Global Orbiting Navigation System (GLONASS), and to any other compatible satellite-based system that provides information by which an observer's position and the time of observation can be determined.

The Global Positioning System (GPS) is being developed and operated to support military navigation and timing needs at an estimated cost of about $8–10 billion. GPS represents an almost ideal dual-use technology and enjoys increased attention by civilians to explore its suitability for civil applications. The complete GPS system consists of 24 operational satellites and provides 24-hour, all-weather navigation and surveying capability worldwide. A major milestone in the development of GPS was achieved on 8 Dec. 1993, when the Initial Operational Capability (IOC) was declared as 24-satellites were successfully operating.

The implication of IOC is that commercial, national, and international civil users can rely on the availability of the Standard Positioning Service. Current policies quantify SPS as 100-meter, 95 % position accuracy for a single user. Authorized (military) users will have access to the Precise Positioning Service (PPS), which provides a greater degree of accuracy. The PPS access is controlled by cryptographic means.

The satellites transmit at frequencies L1=1575.42 MHz and L2=1227.6 MHz modulated with two types of codes and with a navigation message. The two types of codes are the C/A-code and the P-code. SPS is based on the C/A-code, whereas PPS is provided by the P-code portion of the GPS signal. The current authorized level of SPS follows from an intentional degradation of the full C/A-code capability. This measure is called selective availability (SA) and includes falsification of the satellite clock (SA-dither) and the broadcast satellite ephemeris (SA-epsilon), which is part of the navigation message. Despite selective availability, the C/A-code is fully accessible by civilians. On 31 Jan. 1994 the AS was finally implemented. The purpose of AS is to make the P-codes available only to authorized and military users. Users must be equipped with a decryption device or the "key" in order to lock on to P-codes. AS is implemented through a modification of the mathematical formula of the P-code using a classified rule. The encrypted P-code is referred to as the Y-code.

Two types of observable are of interest to users. One is the pseudorange, which equals the distance between the satellite and the receiver plus small corrective terms due to clock errors, the ionosphere, the troposphere, and the multipath. Given the geometric positions of the satellites (satellite ephemeris), four pseudoranges are sufficient to compute the position of the receiver and its clock error. Pseudoranges are a measure of the travel time of the codes (C/A, P, or Y).

The second observable, the carrier phase, is the difference between the received phase and the phase of the receiver oscillator at the epoch of measurement. Receivers are programmed to make phase observations at the same equally spaced epochs. The receivers also keep track of the number of complete cycles received since the beginning of a measurement. Thus, the actual output is the accumulated phase observable at preset epochs.

(The above-referenced discussion is provided in the book "GPS Satellite Surveying", Second Edition, authored by Alfred Leick, and published by John Wiley & Sons, Inc. in 1995; pp 1–3).

Both the SPS and PPS address "classical" navigation, where just one receiver observes the satellites to determine its geocentric position. Typically, a position is computed for every epoch of observation.

However, in the surveying and geodesy applications the relative or differential positioning is used, wherein the relative location between the receivers is determined. In this case, many of the common mode errors cancel or their impact is significantly reduced. This is particularly important in the presence of selective availability. Other error sources can be reduced by observing over a certain period of time while the receivers are in a static position.

The prior art in the field of the GPS satellite surveying is limited to the surveying from a static platform, wherein the GPS receiver performs the survey measurement while being located on the static platform.

What is needed is a dynamic surveying capability, wherein the coordinates of the designated object are acquired using a GPS receiver positioned on a moving platform.

SUMMARY

The present invention is unique because is describes a system and a method for SATPS dynamic surveying, wherein the coordinates of the designated object are acquired using a SATPS receiver positioned on a moving platform.

One aspect of the present invention is directed to a system for dynamic surveying from a moving platform. In one embodiment, the system comprises: (1) a mobile station for performing a dynamic survey; and (2) a first communication link between the mobile station and the differential station. In another embodiment, the system further includes: (3) a second communication link between the mobile station and a third station for transmitting the data from the mobile station to the third station.

In the preferred embodiment, the mobile station includes: (a) a targeting means for targeting a designated object and for determining the value R of the distance between the moving platform and the designated object; (b) a position-angular determination means for determining the location coordinates (X1, Y1, Z1) of the moving platform and angular orientation coordinates ($\theta$, $\phi$) of the normal vector to the moving platform; (c) a first communication means for receiving the differential corrections from a SATPS differential station; (d) a computer means for processing data including the differential corrections, the location coordinates (X1, Y1, Z1) of the moving platform, the angular orientation coordinates ($\theta 1$, $\phi 1$) of the sighting line between the targeting device and the target, the angular orientation coordinates ($\theta$, $\phi$) of the normal vector to the moving platform, and the value R of the distance between the moving platform and the designated object in order to obtain the coordinates (X2, Y2, Z2) of the designated object; and (e) a second communication means for transmitting the coordinates (X2, Y2, Z2) and the image of the designated object to the third station.

The moving platform can include: a blimp; a helicopter; a plane; a remotely piloted vehicle; a rocket powered missile; and a ship.

In one embodiment, the targeting means includes a rangefinder means for determining the value R of the distance from an observer to the designated object. In another embodiment, the targeting means further comprises a viewing means for receiving an image of the designated object.

The rangefinder means can comprise a laser range-finder; a radar range-finder; an optical range-finder; or an acoustic range-finder. The viewing means can include a telescope; a videocamera; or an infra-red camera. The viewing means can additionally include a display means for displaying a visual image of the designated object.

The computer means further includes a digital map database for mapping the designated object on the digital map database. The second communication link can transmit the image of the designated object and its coordinates mapped on the designated map from the moving platform to a TV station.

The first communication link (as well as the second communication link) can comprise: (1) a radiowave frequency band; (2) an infrared frequency band; (3) a microwave frequency band; (4) the ISM (industrial scientific medical) unlicensed operation band, wherein the ISM band range is selected from a class of frequency range consisting of 900 MHz, 2.4 GHz, and 5.8 GHz, and wherein the user can own the both ends of the ISM communication system; (5) a real time circuit switched communication link; (6) a 1.8 GHz band, wherein the 1.8 GHz band supports the personal communications services (PCS); (7) a Low Earth Orbiting Satellites (LEOS), wherein the LEOS is used to store and to forward digital packet data; (8) the communication link is selected from a class of radiowave communication means consisting of a cellular telephone communication means, a wireless messaging services, a wireless application services, a wireless WAN/LAN station, and an Earth-satellite-Earth communication module that uses at least one satellite to relay a radiowave signal; (9) an Advanced Mobile Phone System (AMPS) including a modem, wherein the modem is selected from a class consisting of a DSP (digital signal processor) modem, and a cellular digital packet data (CDPD) modem; (10) a digital cellular telephone communication means, wherein the digital cellular telephone communication means includes a means of modulation of digital data over a radiolink selected from a class consisting of a time division multiple access (TDMA) system, and a code division multiple access (CDMA) system; (11) a radiowave frequency band; (12) an infrared frequency band; and (13) a TV frequency band.

In one preferred embodiment, the position-angular determination means includes: (A) at least three co-planar SATPS signal antennas for receiving the satellite signals at different phases; and (B) a processing means for processing the three SATPS satellite signals having different phases, and for determining the location coordinates (X1, Y1, Z1) of the moving platform and angular orientation coordinates (θ, φ) of the normal vector to the moving platform.

In another preferred embodiment, the position-angular determination means includes an out-of-plane system of three SATPS antennas.

Another mode of the present invention is directed to the above described system that is employed for dynamic targeting the predetermined location with the known coordinates.

One more aspect of the present invention is directed to a method for dynamic surveying from a moving platform. The method comprises the steps of: (1) targeting a designated object and determining the value R of the distance between the moving platform and the designated object using a targeting means; (2) determining the location coordinates (X1, Y1, Z1) of the moving platform and angular orientation coordinates (θ, φ) of the normal vector to the moving platform using a position-angular determination means; (3) receiving differential corrections from a SATPS differential station utilizing a communication means; and (4) processing the data including the differential corrections, the location coordinates (X1, Y1, Z1) of the moving platform, the angular orientation coordinates (θ, φ) of the normal vector to the moving platform, and the value R of the distance between the moving platform and the designated object in order to obtain the coordinates (X2, Y2, Z2) of the designated object using a computer means.

In the preferred embodiment, the method can further include the steps of: (5) receiving the image of the designated object using a viewing means; (6) mapping the image of the target combined with its coordinates on the map; and (7) transmitting the electronic map including coordinates and images of the designated object from the mobile station to a third station using a second communication link between the mobile station and the third station.

Yet another aspect of the present invention is directed to a method for dynamic targeting the predetermined location with coordinates (X2, Y2, Z2) from a moving platform. The method comprises the steps of: (a) determining the location coordinates (X1, Y1, Z1) of the moving platform using a position determination means; (b) receiving the differential corrections from a SATPS differential station employing a first communication means; (c) continuously processing data including coordinates (X2, Y2, Z2) of the predetermined location and coordinates of the moving platform (X1, Y1, Z1) using a computer means in order to determine in real time the value R of the distance and the angular orientation coordinates (θ1, φ1) of the sighting line between the moving platform and the predetermined location; and (d) targeting the predetermined location with coordinates (X2, Y2, Z2) employing a targeting means that uses the value of the distance R and the angular coordinates (θ1, φ1) of the sighting line between the moving platform and the predetermined location.

BRIEF DESCRIPTION OF THE DRAWINGS

FIG. 1 depicts a system for dynamic surveying from a moving platform.

FIG. 2 is an illustration of a targeting device.

FIG. 3 shows a position-angular determination device.

FIG. 4 depicts a flow chart of the method of the dynamic surveying from a mobile station.

FULL DESCRIPTION OF THE PREFERRED EMBODIMENT

FIG. 1 is a depiction of a system 10 for dynamic surveying from a moving platform 28. In one preferred embodiment, the system for dynamic surveying from a moving platform includes a mobile station 26 that performs a dynamic surveying of a designated object 20. The moving platform can include: a blimp, a helicopter, a plane, a remotely piloted vehicle, a rocket powered missile, a ship, or any other moving platform capable of carrying a mobile station for performing a dynamic surveying operation. The designated object 20 can include a remote object.

In the preferred embodiment, the mobile station 26 includes a position-angular determination means 38 for determining the coordinates (X1, Y1, Z1) of the mobile station and for determining the angular coordinates (θ, φ), of the normal to the moving platform. In order to improve the accuracy of the survey data, the position-angular determination means 38 receives the differential corrections broadcasted by the differential station 48 via a first communication link 46 using the first communication device 36.

The mobile station 26 further includes a targeting device 40 for targeting the target object 20, and for receiving coordinates (X2, Y2, Z2) and images of the remote object 20.

The mobile station includes a computer 34 including a display 32 and a digital map 30 for processing the data information including the coordinates (X1, Y1, Z1) of the mobile station, the angular coordinates (θ, φ) of the normal to the moving platform, and the coordinates (X2, Y2, Z2) of the target; and for processing and mapping the image of the target and the coordinates of the target on the electronic map.

In the preferred embodiment, the mobile station transmits, using the second communication device 42, the mapped together data and images of the target object to the third station 22 via a second communication link 24.

As depicted in FIG. 3, the targeting device 40 includes a rangefinder 84 that allows the determination of value R of the distance between the mobile station and the remote object. In another preferred embodiment, the targeting device 40 additionally includes a viewing device 82 for receiving images of the remote object 20.

In one preferred embodiment, the rangefinder includes a laser rangefinder including a laser beam source. In one more preferred embodiment the rangefinder includes an optical rangefinder. Yet, in another preferred embodiment, the rangefinder includes a radar range-finder including an acoustic sonic or ultrasonic beam source.

In all cases, the beam source directs a thin beam of energy in a chosen frequency range from the targeting device to the designated target object. This radiation is scattered from a small irradiated portion of the target and is detected by the range finder. (The targeting device that can be used for the purposes of the present invention is disclosed in the U.S. patent application entitled "Integrated Image Transfer for Remote Target Location", Ser. No. 08/191,815 filed on 4 Feb. 1994, which is incorporated herein by reference.) The distance R of the target sighting line (44) from the target 20 to the targeting device 40 is estimated to be:

$$R = c'' \Delta t(\text{return})/2, \quad (1)$$

wherein c' is the velocity of propagation in the troposphere of radiation having the chosen frequency, and $\Delta t(\text{return})/2$ is a time interval of measured length needed for return of an emitted radar signal.

The position-angular determination device 38 can be mounted on the targeting device 40 that is used to sight a target. The position-angular determination device (see discussion below) is capable of determining the coordinates (X1, Y1, Z1) of the mobile station 26 and the angular coordinates (θ, φ) of the normal vector to the mobile station. The position-angular determination device can be also used to determine the angular coordinates (θ1, φ1) of the target sighting line (44) from the targeting device (40) to the target (20).

If the rangefinder 40 is known to be at a location with Cartesian coordinates (X1, Y1, Z1), if the target 20 is known to lie at a distance R from the rangefinder, and if the rangefinder angular orientation with azimuthal angle Φ1 and polar angle θ1 relative to the X1Y1 plane in this coordinate system, the target coordinates (X2, Y2, Z2) in this system become:

$$X2 = X1 + R \sin(\Phi 1) \sin(\theta 1), \quad (2)$$

$$Y2 = Y1 + R \cos(\Phi 1) \sin(\theta 1), \quad (3)$$

$$Z2 = Z1 + R \cos(\theta 1). \quad (4)$$

The targeting device can additionally include a viewing device (see FIG. 2). In one preferred embodiment, the viewing device includes a telescope. In another preferred embodiment, the viewing device can include a videocamera; or an infra-red camera. The viewing device can be used to acquire an image of the target in addition to acquiring the coordinates of the target. The viewing device can also include a display means for displaying a visual image of the designated target object on a designated map. The designated map can comprise a computer database map.

In the preferred embodiment, the mobile station 26 employs the position-angular determination device 38 (see FIG. 3) comprising three Global Positioning System (GPS) antennas (a first antenna 112, a second antenna 114, and a third antenna 116). Each GPS antenna can be implemented using a magnetically mountable model 21423-00 commercially available from Trimble Navigation of Sunnyvale, Calif. As shown in FIG. 1, each GPS antenna is placed on the moving platform 28 with the direct view of the sky in order to receive the satellite signals from at least four satellite-vehicles SV1 (12), SV2 (14), SV3 (16), and SV4 (18) that are part of the GPS.

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiplies f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P(Y)-code. The L2 signal from each satellite is BPSK modulated by only the P(Y)-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay~$f^2$). This phenomenon is discussed by MacDoran in U.S. Pat. No. 4,463,357, which discussion is incorporated by reference herein. When transit time delay through the ionosphere is determined, a phase delay associated with a given carrier signal can also be determined.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P(Y)-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P(Y)-code and is a relatively short, coarser-grained code having a clock or chip rate of f0=1.023 MHz. The C/A-code for any GPS satellite has a length of 1023 chips or time increments before this code repeats. The full P(Y)-code has a length of 259 days, with each satellite transmitting a unique portion of the full P(Y)-code. The portion of P(Y)-code used for a given GPS satellite has a length of precisely one week (7.000 days) before this code portion repeats. Accepted methods for generating the C/A-code and the P(Y)-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeris of the transmitting GPS satellite (which includes a complete information about the transmitting satellite within the next several hours of transmission) and an almanac for all GPS satellites (which includes less detailed information about all other satellites). The satellite information has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k (=0,1,2, . . . 23) is the channel or satellite number. These frequencies lie in two bands at 1.597–1.617 GHz (L1) and 1,240–1,260 GHz (L2). The L1 code is modeled by a C/A-code (chip rate =0.511 MHz) and by a P(Y)-code (chip rate =5.11 MHz). The L2 code is presently modeled only by the P(Y)-code.

The GLONASS satellites also transmit navigational data at a rate of 50 Baud. Because the channel frequencies are distinguishable from each other, the P(Y)-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

However, the above described method of absolute positioning is far less accurate than method of differential positioning. As was explained above, the present invention uses the method of the differential GPS location determination. (For the complete reference on the differential GPS positioning see *The NAVSTAR Global Positioning System*, by Tom Logsdon, published by Van Nostrand in 1992, pp. 76–90, and incorporated by reference herein).

The first (36) communication system used for receiving the differential corrections from a differential station 48 can be implemented using a standard radio receiver system.

Referring again to FIG. 3, the position-angular determination device 38 includes three antennas each of which provides a different phase path for a received satellite signal (path 106 for the first antenna 112, path 108 for the second antenna 114, and path 110 for the third antenna 110). The position-angular determination device further includes a processor 102. The enabling disclosure of the position-angular determination device 38 of FIG. 3 including three co-planar GPS antennas which utilizes the differential phase measurement of the satellite signals through antenna multiplexing is provided in the U.S. Pat. No 5,268,695, that is incorporated by reference herein. The device disclosed in the U.S. Pat. No 5,268,695 uses a system for time multiplexing a carrier signal received by three GPS antennas through a single hardware path. An oscillator in a single receiver in that hardware path is used as a reference to compare the phase from each antenna. The device 38 (so called vector-system) allows to determine the coordinates (X1, Y1, Z1) of the mobile station 26, and the angular coordinates ($\theta$, $\phi$) of the normal vector to the moving platform. However, the disclosed co-planar vector-system of three-SATPS antenna array can operate only if the three-SATPS antenna array is mounted in the plane of the moving platform.

In another embodiment, the mobile station employs as its position-angular determination means 38 an out-of-plane vector system of three SATPS antennas. The out-of-plane vector system of three SATPS antennas can be mounted in three dimensions rather than in the plane of the mobile station which carrier it. The enabling disclosure of such out-of-plane vector system is provided in the U.S. patent application Ser. No. 08/439,759 entitled "Out of plane antenna vector system and method", filed on May 12, 1995, and incorporated by reference herein.

The computer 34 performs the calculations of the coordinates (X2, Y2, Z2) of the designated target object 20 using the differential corrections, the coordinates (X1, Y1, Z1) of the mobile station, the angular coordinates (θ1, φ1) of the sighting line 44, and the distance R from the moving platform to the target object. The computer used in the present invention while performing the calculation of the coordinates of the target object takes into account the timing characteristics of the dynamic surveying process from a moving platform.

The computer 34 can further include the digital map 30 and the digital display 32 for displaying the images of the target object 20. It can also perform the mapping of the target images with the target coordinates on the electronic map. The computer 34 can be implemented using a personal Pentium®-based IBM computer running a Microsoft Windows®-95 operating system.

The mobile station further employs the second (42) communication system for transmitting the electronic map with the images and coordinates of the remote object to the third station 24 (the third station being a TV station). In this embodiment, the second communication means can be implemented using a standard TV broadcasting system. In another embodiment, only the coordinates of the target object can be transmitted to the third station (the third station being a radio station) using the radio-transmitter.

In both cases, the mobile station employs a second communication link for transmitting the electronic map including the coordinates and images of the designated object 20 (or only coordinates of the target object) to a third station.

In general, the communication link (both the first communication link 46 and the second communication link 24) can employ a radiowave frequency band, an infrared frequency band, or a microwave frequency band.

In one embodiment, the communication link can include the ISM (industrial scientific medical) unlicensed operation band, including 900 MHz, 2.4 GHz, or 5.8 GHz bands, wherein the user can own the both ends of the ISM communication system. The ISM technologies are manufactured by Metricom, Los Gatos, Calif., and by Utilicom, Santa Barbara, Calif.

In another embodiment, the communication link can employ a 1.8 GHz band that supports the personal communications services (PCS). The PCS uses the international standard DCS-1800. Yet, in one more embodiment, the communication link can include a real time circuit switched communication link. For instance, the communication link employing a real time circuit switched communication link can include the Iridium satellite system produced by Motorola, Schaumburg, Ill. In one additional embodiment, the communication link can employ a Low Earth Orbiting Satellite (LEOS) which can be used to store and to forward digital packet data. The LEOS systems in 27 GHz range are manufactured by Teledesic located in Redmond, Wash., and the LEOS systems in 5 GHz range are produced by Oriscom located in Chantilly, Va.

The communication link can include a cellular telephone communication means, a wireless messaging services, a wireless application services, a wireless WAN/LAN station, or an Earth-satellite-Earth communication module that uses at least one satellite to relay a radiowave signal.

The present invention also discloses a method for dynamic surveying from a moving platform as depicted in FIG. 4. The flow chaff 120 comprises the sequence of steps.

The first step 122 is a step of targeting a designated object 20 and determining the value R of the sight line (44) distance between the moving platform 28 and the designated object 20 using a targeting device.

The next step is the step 124 of viewing a target in order to receive an image. The location coordinates (X1, Y1, Z1) of the moving platform and angular orientation coordinates (θ, φ) of normal vector to the moving platform are determined using the position-angular determination device 38 (step 126). The position-angular determination device 38 can be implemented by using a co-planar system of three SATPS antennas or an out-of-plane system of three SATPS antennas.

After receiving differential corrections from a SATPS differential station (step 127), the coordinates (X2, Y2, Z2) of the target object are computed (step 128) using the differential corrections, the location coordinates (X1, Y1, Z1) of the moving platform, the angular coordinates (θ1, φ1) of the sighting line, and the value R of the distance of the sighting line between the moving platform and the target object using the computer 34.

The step 130 is the step of mapping the images of the target with the target coordinates (X2, Y2, Z2) on the electronic map using the computer 34. Lastly, the step 132 is the step of transmitting the coordinates and the image of the designated object from the mobile station to the third station using a second communication link between the mobile station and the third station. This step can also include the transmitting of the electronic map including the coordinates and the image of the designated object.

The present invention can be used for acquiring the coordinates and thus performing the dynamic surveying of the remote object from the moving platform. However, the image of the remote object can be also received, mapped together with the coordinates of the remote object, and transmitted to the third station. Thus, one embodiment of the present invention can include a TV broadcasting from a helicopter of an electronic map including images of remote target objects mapped with the coordinates of these remote objects.

In another preferred mode of operation the system of the present invention can be employed for dynamic targeting of the predetermined location with the coordinates (X2, Y2, Z2). In this mode of operation, the system of equations (2–4) is solved by computer means in order to determine the unknown value R and the unknown angular coordinates (θ1, φ1) of the sighting line between the mobile station and the predetermined location using the known coordinates of the predetermined location (X2, Y2, Z2) and the coordinates of the mobile station (X1, Y1, Z1). The angular-position determination means in combination with the differential SATPS station that broadcasts the differential corrections are employed to determine the location coordinates (X1, Y1, Z1) of the moving platform. The targeting means are used for targeting the predetermined location with coordinates (X2, Y2, Z2) using the value of the distance R and the angular coordinates (θ1, φ1) of the sighting line between the moving platform and the predetermined location. The targeting means can include the weapon systems.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A system for dynamic surveying from a moving platform comprising:

a mobile station for performing a dynamic survey, said mobile station comprising:

a targeting means communicatively connected to said moving platform for targeting a designated object and for determining the value R of the distance between said moving platform and said designated object;

a position-angular determination means communicatively coupled to said moving platform for determining the location coordinates (X1, Y1, Z1) of said moving platform and angular orientation coordinates (θ, φ) of a normal vector to said moving platform;

a first communication means communicatively connected to said moving platform for receiving the differential corrections from a SATPS differential station; wherein said differential station broadcasts the differential corrections;

a computer means coupled to said first communication means for continuously processing data including: (a) the differential corrections, (b) the location coordinates (X1, Y1, Z1) of said moving platform, (c) the angular orientation coordinates (θ, φ) of the normal vector to said moving platform, and (d) the value R of the distance between said moving platform and said designated object in order to obtain the coordinates (X2, Y2, Y2) of said designated object;

and a first communication link between said mobile station and said differential station.

2. The system of claim 1 further including:

a second communication means communicatively connected to said moving platform; and a second communication link between said mobile station and a third station for transmitting the dam from said mobile station to said third station.

3. The system of claim 2, wherein said moving platform comprises:

a blimp.

4. The system of claim 2, wherein said moving platform comprises:

a helicopter.

5. The system of claim 2, wherein said moving platform comprises:

a plane.

6. The system of claim 2, wherein said moving platform comprises:

a remotely piloted vehicle.

7. The system of claim 2, wherein said moving platform comprises:

a rocket powered missile.

8. The system of claim 2, wherein said moving platform comprises:

a ship.

9. The system of claim 2, wherein said targeting means further comprises:

a rangefinder means coupled to said moving platform for determining the value R of the distance from an observer to said designated object.

10. The system of claim 2, wherein said targeting means further comprises:

a rangefinder means connected to said moving platform for determining the value R of the distance from an observer to said designated object; and a viewing means for receiving an image of said designated object.

11. The system of claim 10, wherein said viewing means further comprises:

a telescope.

12. The system of claim 10, wherein said viewing means further comprises:

a videocamera.

13. The system of claim 10, wherein said third station is a TV station, and wherein said second communication link transmits the image of said designated object from said moving platform to said TV station.

14. The system of claim 10, wherein said viewing means further comprises:

an infra-red camera.

15. The system of claim 10, wherein said viewing means further comprises:

a display means for displaying a visual image of said designated object.

16. The system of claim 10, wherein said rangefinder means further comprises:

a laser range-finder.

17. The system of claim 10, wherein said rangefinder means further comprises:

an optical range-finder.

18. The system of claim 10, wherein said rangefinder means further comprises:

an acoustic range-finder.

19. The system of claim 10, wherein said rangefinder means further comprises:

a radar range-finder.

20. The system of claim 2, wherein said computer means further includes:

a digital map database for mapping said designated object on said digital map database.

21. The system of claim 2, wherein said first communication link comprises:

a radiowave frequency band.

22. The system of claim 2, wherein said first communication link includes:

an infrared frequency band.

23. The system of claim 2, wherein said first communication link includes:

a microwave frequency band.

24. The system of claim 2, wherein said first communication link includes:

the ISM (industrial scientific medical) unlicensed operation band, and wherein the ISM band range is selected from a class of frequency range consisting of 900 MHz, 2.4 GHz, and 5.8 GHz; and wherein the user can own the both ends of the ISM communication system.

25. The system of claim 2, wherein said first communication link includes:

a real time circuit switched communication link.

26. The system of claim 2, wherein said first communication link includes:

a 1.8 GHz band, wherein said 1.8 GHz band supports the personal communications services (PCS).

27. The system of claim 2, wherein said first communication link includes:

a Low Earth Orbiting Satellites (LEOS), wherein said LEOS is used to store and to forward digital packet data.

28. The system of claim 2, wherein said first communication link is selected from a class of radiowave communication means consisting of a cellular telephone communication means, a wireless messaging services, a wireless application services, a wireless WAN/LAN station, and an Earth-satellite-Earth communication module that uses at least one satellite to relay a radiowave signal.

29. The system of claim 2, wherein said first communication link includes:

an Advanced Mobile Phone System (AMPS) including a modem, and wherein said modem is selected from a class consisting of a DSP (digital signal processor) modem, and a cellular digital packet data (CDPD) modem.

30. The system of claim 2, wherein said first communication link includes:

a digital cellular telephone communication means, and wherein said digital cellular telephone communication means includes a means of modulation of digital data over a radiolink selected from a class consisting of a time division multiple access (TDMA) system, and a code division multiple access (CDMA) system.

31. The system of claim 2, wherein said second communication link comprises:

a radiowave frequency band.

32. The system of claim 2, wherein said second communication link includes:

an infrared frequency band.

33. The system of claim 2, wherein said second communication link includes:

a microwave frequency band.

34. The system of claim 2, wherein said second communication link includes:

the ISM (industrial scientific medical) unlicensed operation band, and
wherein the ISM band range is selected from a class of frequency range consisting of 900 MHz, 2.4 GHz, and 5.8 GHz; and wherein the user can own the both ends of the ISM communication system.

35. The system of claim 2, wherein said second communication link includes:

a real time circuit switched communication link.

36. The system of claim 2, wherein said second communication link includes:

a 1.8 GHz band, wherein said 1.8 GHz band supports the personal communications services (PCS).

37. The system of claim 2, wherein said second communication link includes:

a Low Earth Orbiting Satellites (LEOS), wherein said LEOS is used to store and to forward digital packet data.

38. The system of claim 2, wherein said second communication link is selected from a class of radiowave communication means consisting of a cellular telephone communication means, a wireless messaging services, a wireless application services, a wireless WAN/LAN station, and an Earth-satellite-Earth communication module that uses at least one satellite to relay a radiowave signal.

39. The system of claim 2, wherein said second communication link includes:

an Advanced Mobile Phone System (AMPS) including a modem, and
wherein said modem is selected from a class consisting of a DSP (digital signal processor) modem, and a cellular digital packet data (CDPD) modem.

40. The system of claim 2, wherein said second communication link includes:

a digital cellular telephone communication means, and wherein said digital cellular telephone communication means includes a means of modulation of digital data over a radiolink selected from a class consisting of a time division multiple access (TDMA) system, and a code division multiple access (CDMA) system.

41. The system of claim 2, wherein said second communication link comprises:

a TV frequency band.

42. The system of claim 2, wherein said position-angular determination means communicatively connected to said targeting means for determining the location coordinates (X1, Y1, Z1) of said moving platform and angular orientation coordinates ($\theta$, $\phi$), of the normal vector to said moving platform further includes:

at least three SATPS signal antennas for providing at least three satellite signals having different phases; and a processing means connected to each said SATPS antenna for processing said three SATPS satellite signals having different phases, and for determining the location coordinates (X1, Y1, Z1) of said moving platform and angular orientation coordinates ($\theta$, $\phi$) of the normal vector to said moving platform.

43. The system of claim 42, wherein said at least three SATPS signal antennas includes a co-planar system of said at least three SATPS antennas.

44. The system of claim 42, wherein said at least three SATPS signal antennas includes an out-of plane system of said at least three SATPS antennas.

45. A system for dynamic surveying comprising:

a mobile station for performing a dynamic survey, said mobile station comprising:

a moving platform;

a targeting means communicatively connected to said moving platform for targeting a designated object and for determining the value R of the distance between said moving platform and said designated object;

a position-angular determination means communicatively coupled to said moving platform for determining the location coordinates (X1, Y1, Z1) of said moving platform and angular orientation coordinates ($\theta$, $\phi$) of a normal vector to said moving platform;

a first communication means communicatively connected to said moving platform for receiving the differential corrections from a SATPS differential station; wherein said differential station broadcasts the differential corrections;

a computer means coupled to said first communication means for continuously processing data including: (a) the differential corrections, (b) the location coordinates (X1, Y1, Z1) of said moving platform, (c) the angular orientation coordinates ($\theta$, $\phi$) of the normal vector to said moving platform, and (d) the value R of the distance between said moving platform and said designated object in order to obtain the coordinates (X2, Y2, Y2) of said designated object; and a first communication link between said mobile station and said differential station.

46. A system for dynamic targeting a predetermined location with coordinates (X2, Y2, Z2) from a moving platform, said system comprising:

a position determination means communicatively coupled to said moving platform for determining the location coordinates (X1, Y1, Z1) of said moving platform;

a first communication link between said moving platform and a SATPS differential station;

a first communication means communicatively connected to said moving platform for receiving the differential corrections from said SATPS differential station; wherein said differential station broadcasts the differential corrections;

a computer means coupled to said first communication means for continuously processing data including coordinates (X2, Y2, Z2) of said predetermined location and coordinates of said moving platform (X1, Y1, Z1) in order to determine in real time the value R of the distance and the angular orientation coordinates ($\theta 1$, $\phi 1$) of the sighting line between said moving platform and said predetermined location; and a targeting means communicatively connected to said moving platform for targeting said predetermined location with coordinates (X2, Y2, Z2) using the value of the distance R and the angular coordinates ($\theta 1$, $\phi 1$) of the sighting line between said moving platform and said predetermined location.

47. A method for dynamic surveying from a moving platform, said method comprises the steps of:

targeting a designated object and determining the value R of the distance between said moving platform and said designated object using a targeting means;

determining the location coordinates (X1, Y1, Z1) of said moving platform and angular orientation coordinates ($\theta$, $\phi$) of a normal vector to said moving platform using a position-angular determination means;

receiving differential corrections from a SATPS differential station utilizing a communication means; wherein said differential station broadcasts the differential corrections; and processing the data including the differential corrections, the location coordinates (X1, Y1, Z1) of said moving platform, the angular orientation coordinates ($\theta$, $\phi$) of the normal vector to said moving platform, and the value R of the distance between said moving platform and said designated object in order to obtain the coordinates (X2, Y2, Y2) of said designated object using a computer means.

48. The method of claim 47 further including the step of:

receiving the image of said designated object using a viewing means.

49. The method of claim 48 further including the step of:

mapping the received images of said designated object with the coordinates of the designated object on the electronic map using a computer means.

50. The method of claim 48 further including the step of:

transmitting the coordinates and the image of said designated object from said mobile station to a third station using a second communication link between said mobile station and said third station.

51. The method of claim 49 further including the step of:

transmitting the electronic map including the coordinates and the image of said designated object from said mobile station to a third station using a second communication link between said mobile station and said third station.

52. A method for dynamic targeting a predetermined location with coordinates (X2, Y2, Z2) from a moving platform, said method comprising the steps of:

determining the location coordinates (X1, Y1, Z1) of said moving platform using a position determination means;

receiving the differential corrections from a SATPS differential station employing a first communication means;

continuously processing data including coordinates (X2, Y2, Z2) of said predetermined location and coordinates of said moving platform (X1, Y1, Z1) using a computer means in order to determine in real time the value R of the distance and the angular orientation coordinates ($\theta 1$, $\phi 1$) of the sighting line between said moving platform and said predetermined location; and targeting said predetermined location with coordinates (X2, Y2, Z2) employing a targeting means that uses the value of the distance R and the angular coordinates ($\theta 1$, $\phi 1$) of the sighting line between said moving platform and said predetermined location.

\* \* \* \* \*